United States Patent [19]

Ando

[11] 4,303,826
[45] Dec. 1, 1981

[54] SHIELDED SKIN-EFFECT CURRENT HEATED PIPELINE

[75] Inventor: Masao Ando, Yokohamashi, Japan

[73] Assignee: Chisso Corporation, Tokyo, Japan

[21] Appl. No.: 123,190

[22] Filed: Feb. 20, 1980

[30] Foreign Application Priority Data

Feb. 21, 1979 [JP] Japan .................................. 54-19432

[51] Int. Cl.$^3$ .................. H05B 3/00; F16L 53/00
[52] U.S. Cl. ............... 219/301; 219/10.51; 219/300; 137/341; 138/33
[58] Field of Search ............... 219/10.49, 10.51, 300, 219/301; 137/341; 138/33

[56] References Cited

U.S. PATENT DOCUMENTS

| | | | |
|---|---|---|---|
| 3,293,407 | 12/1966 | Ando | 219/301 |
| 3,515,837 | 6/1970 | Ando | 219/10.51 |
| 3,665,154 | 5/1972 | Ando | 219/301 |
| 3,755,650 | 8/1973 | Ando | 219/301 |
| 3,780,250 | 12/1973 | Ando | 219/10.49 |

Primary Examiner—A. Bartis

Attorney, Agent, or Firm—Fred Philpitt

[57] ABSTRACT

A pipeline to be laid over a very long distance e.g. 100 km, and heated by skin-effect-current, and used underground or on the seabed by employing an electric source frequency lower than commercial ones, is provided. The pipeline consists of a fluid-transporting pipe and a heat-generating pipe utilizing skin effect current laid so as to trace said fluid-transporting pipe (which will be referred to herein as SECT pipe). The SECT pipe consists of a ferromagnetic pipe and an insulated electric wire passed therethrough, and has a special circuit, and the pipeline is further provided with an outer covering pipe of a ferromagnetic material so as to enclose the fluid-transporting pipe and the SECT pipe. The covering pipe is electrically connected to at least both end portions of the SECT pipe and the thickness of the outer covering pipe is so devised that an alternating current having leaked out of the SECT pipe substantially does not appear on the outside of the outer covering pipe, but flows only through the inner skin portion thereof.

4 Claims, 2 Drawing Figures

SHIELDED SKIN-EFFECT CURRENT HEATED PIPELINE

BACKGROUND OF THE INVENTION

1. Field of the Invention

This invention relates to pipelines assemblies formed by a heat-generating pipe utilizing skin-effect-current (which will be hereinafter referred to as a SECT pipe) and a fluid transporting pipe heated by the former (i.e. SECT pipe) to maintain the temperature of the latter. More particularly, it relates to the pipeline assemblies extending to a great length that requires a high voltage, e.g. exceeding 5 kV to be applied to the SECT pipe. The purpose of the present invention is to provide the economical heating assemblies for the cases where the use of insulated electric wire withstanding such high voltage is not economical or where power cannot be supplied to the SECT pipe at intermediate positions along its length, such as for underground pipelines, particularly to be laid on the seabed over a long distance.

2. Description of the Prior Art

The heat generating pipe which utilizes skin-effect-current (which will be referred to in this specification as SECT pipe) means those containing a ferromagnetic pipe, an insulated electric wire passed therethrough and such a circuit in which when a first alternating current is caused to flow through the above-mentioned electric wire, a second alternating current is caused to flow in the opposite direction in response to the first in such a manner that flow is concentrated on the vicinity of the inner surface of the ferromagnetic pipe. There are two kinds of circuit possessed by such a SECT pipe, when roughly classified. In the circuit of the first kind, the above-mentioned ferromagnetic pipe and insulated electric wire passed therethrough are electrically connected to an electric source at the respective one ends thereof and also electrically connected to each other at the respective other ends. An example of the SECT pipe having such a circuit is disclosed in the specification of Japanese Pat. No. 460,224 (or U.S. Pat. No. 3,293,407). Although the SECT pipe referred to in the above-mentioned specification requires a definite limitation to the thickness of the ferromagnetic pipe, it is possible according to the present invention to alleviate such a limitation. In the circuit of the second kind, both the ends of the above-mentioned insulated electric wire are electrically connected to an alternating current electric source to form a closed circuit and both the ends of the above-mentioned ferromagnetic pipe are electrically connected to each other so as to give as low an impedance as possible to form a closed circuit. An example of the SECT pipe having such a circuit is disclosed in the specification of Japanese Patent No. 612,750 (or U.S. Pat. No. 3,515,837). Although the SECT pipe referred to in the specification of the above-mentioned patent requires a definite limitation to the thickness of the ferromagnetic pipe, it is possible according to the present invention to alleviate such a limitation.

In the SECT pipes, whether of the first kind or of the second, the cross-sectional shape of the ferromagnetic pipe is not limited only to a circular one, but may be e.g. a triangular or lunette one. A portion of the wall of the above-mentioned ferromagnetic pipe may be constructed by the wall of the transporting pipe of ferromagnetic material to be heated. The above-mentioned ferromagnetic pipe may have intermediate breaks where the respective adjacent ends are electrically connected to each other. Further, the cross-sectional shape of the above-mentioned ferromagnetic pipe need not be a completely closed one, but may have a shape having a slit or slits. An example of such a ferromagnetic pipe is the one having a circular cross-section but containing a slit or slits in the direction of length (whereby it is possible to reduce the heat quantity generated at the portion of the ferromagnetic pipe corresponding to the length of the slit or slits). Further, another example is a ferromagnetic pipe wherein a member of ferromagnetic material having a cross-section of an inverted V shape is placed on a transporting pipe of ferromagnetic material in such a way that the skirts of the inverted V are contacted with and stitch-welded to the surface of the transporting pipe.

Now, the principle of one of known SECT pipes will be described in detail referring to FIG. 1 of the accompanying drawings. In FIG. 1, numeral 1 shows a ferromagnetic pipe such as steel pipe and numeral 2 shows an insulated electric wire or cable passed therethrough. The electric wire 2, together with a connecting electric wire 3, connect both the ends 8 and 9 of the pipe 1 to both the ends of an alternating current electric source 4, to form an alternating current circuit.

In the SECT pipe having such a circuit, the alternating current flows in concentrated manner on the vicinity of the inner surface of the ferromagnetic pipe. Namely, the nearer to the inner surface the depth, the larger the current density there, while the remoter therefrom the depth, the smaller the current density. When the specific resistivity of the material of the ferromagnetic pipe is $\rho(\Omega cm)$; the specific permeability thereof is $\mu$; and the frequency of the electric source is f (Hz), the skin depth S (cm) which is regarded as an index indicating the range in which the alternating current flows is expressed by the following equation:

$$S = 5030\sqrt{\frac{\rho}{\mu f}} \quad (1)$$

Further, if the thickness of the ferromagnetic pipe is t (cm), its length is l (cm) and its inner diameter is d (cm), and among them, there are relationships of $$t > 2s \ (2); \ l >> d \ (3),$$

then the current 5 flowing through the insulated electric wire or cable 2 does not flow uniformly through the cross-section of the ferromagnetic pipe 1, but flows in concentrated manner mostly on the inner skin portion having a depth expressed by the above-mentioned equation (1). Thus, even when the outer portion of the pipe is short-circuited with a good conductor such as metal, the current 5 practically does not flow out to this short-circuiting conductor, and the current 5' flowing through the inner skin portion of the ferromagnetic pipe is nearly equal to the current 5. Even when such a SECT pipe is connected by welding to a transporting pipe of metal 12 over the total length thereof as shown in FIG. 1, the current 7 flowing out to the transporting pipe 12 is extremely small.

Now, if a commercial frequency of 60 Hz or 50 Hz is employed for the electric source and a usual steel pipe is employed as the ferromagnetic pipe, the skin depth expressed by the equation (1) is about 1 mm. Thus, a thickness of the pipe 1 of 3–5 mm can satisfy the above-mentioned equation (2), and current flows in concentrated manner on the inner thin skin portion of the steel pipe 1 where heat is generated; hence current substantially does not flow out to the outer portion of the pipe whereby safety can be maintained.

If such a SECT pipe has an inner diameter of 10~50 mm, a current of 50–250 A is usually employed. Thus, since the voltage per 1 km amounts to about 500 V, a pipeline having a length of about 10 km requires 5 KV in average as the electric source voltage. Thus, if electricity is fed only through both the ends of the transporting pipe, a heatable length in total, of the pipeline amounts to 20 km which is twice the above-mentioned 10 km.

Accordingly, if the distance of feed of electricity is 20 km or longer, an insulated cable 2 which endures 5 KV or higher is necessary. It is also necessary that such an insulated cable 2 endure a temperature at which the transporting pipe is maintained. Since such a temperature at which the pipe is maintained is, in general, higher than the atmospheric temperature, usual insulated cables cannot be employed and special heat-resistant, insulating materials are employed. This is expensive and thus uneconomical.

Recently, pipelines whose temperature is maintained by employing such a SECT pipe has been increasing in the length, and those exceeding 100 km are not rare. In case of such long pipelines installed on the ground, the above-mentioned uneconomical problem has been solved by feeding electricity to the pipelines at intermediate positions, but in case of such long pipelines installed on the seabed, since intermediate feed is impossible, the feed must rely only on the insulated wire pulled into the SECT pipe at its end and passed throughout the pipe, which wire, however requires a high voltage due to the long distance of the pipeline. This raises extremely uneconomical or technically infeasible problems.

The object of the present invention is to solve the difficulties in such a case.

SUMMARY OF THE INVENTION

The present invention resides in a pipeline to be heated by skin-effect current wherein a skin-effect current heat-generating pipe abbreviated to SECT pipe is laid along a fluid-transporting pipeline. The SECT pipe consists of a ferromagnetic pipe and an insulated electric wire passed therethrough and has such an electrical circuit that, when a first alternating current is passed through the electric wire, a second alternating current flows in the ferromagnetic pipe in the direction opposite to that of the first current in response thereto, and that the second current is concentrated in the vicinity of the inner surface of the ferromagnetic pipe. According to the present invention, the pipeline comprises additionally an outer covering pipe of a ferromagnetic material enclosing the outer peripheries of the fluid-transporting pipeline and also the SECT pipe, the outer covering pipe being electrically connected to at least both end portions of the ferromagnetic pipe of the SECT pipe. The thickness of the outer covering pipe is so adjusted that an alternating current having leaked out of the ferromagnetic pipe substantially does not appear on the outside of the outer covering pipe, but flows only through the inner skin portion of the outer covering pipe.

BRIEF DESCRIPTION OF THE DRAWINGS

In FIGS. 1 and 2, a fluid-transporting pipe 12 as a main material constituting the pipeline is traced with a ferromagnetic pipe 1 as a heat-generating pipe, the outside of the transporting pipe being heat-insulated by a heat-insulating layer 13 which is further protected in water-proof manner by an outer covering pipe 14 of a ferromagnetic material (such as steel pipe). Numeral 15 refers to a fluid flowing through the inside of the transporting pipe. The pipeline thus constructed as a whole is embedded under the ground 16 or installed under the water surface 17.

Now, if the total length of the pipeline is 100 km and electricity can be fed only at both the ends thereof, then the distance for which electricity is fed is 50 km, and the electric source voltage is 25 KV in the case of 500 V per km as mentioned above. A high voltage, heat-resistant cable therefor is expensive and uneconomical although its production is not always impossible. Thus, in order to avoid such a high voltage, it is necessary to reduce power input required for the pipeline or if the power input is constant, to reduce the electrical resistance of the SECT pipe, in such a manner that the voltage is applied to the SECT pipe decreases but the current increases. However, since the temperature at which the transporting pipe 12 is maintained is constant, there is no way but to rely on the latter way i.e. on making the resistance of a SECT pipe lower. Since the skin depth indicating the range through which alternating current flows is expressed by S in the above-mentioned equation (1), the resistance R ($\Omega$) of the ferromagnetic pipe 1 is expressed by the following equation (4):

$$R \doteq \rho \frac{l}{\pi ds} = \frac{l\sqrt{\mu f \rho}}{5030 \pi d} \tag{4}$$

Since the length l of the ferromagnetic pipe 1, i.e., the length l of the pipeline, is constant and the material of the ferromagnetic pipe 1 is constant, the resistance R can be reduced only by reducing the frequency f of the electric source or increasing the inner diameter d of the ferromagnetic pipe 1. Although the increase in the inner diameter d is, of course, possible, too large an increase requires an increase in the thickness of the heat-insulating layer 13 covering the ferromagnetic pipe as seen from FIG. 2, and an increase in the diameter of the outer layer steel pipe 14, which is uneconomical. Thus, it is seen that the increase in the inner diameter has a limitation. Accordingly, only a means left is reduction in the frequency f of the electric source.

However, as shown in the equation (1), if f is reduced, s increases; hence it is necessary in view of the relationship of the equation (2) to increase the thickness $t_1$ of the ferromagnetic pipe 1, resulting in increase of cost of the ferromagnetic pipe 1. In this regard, increase in the thickness has a definite limitation. The object of the present invention can be said, more particularly, to overcome such difficulties.

Figure 1:
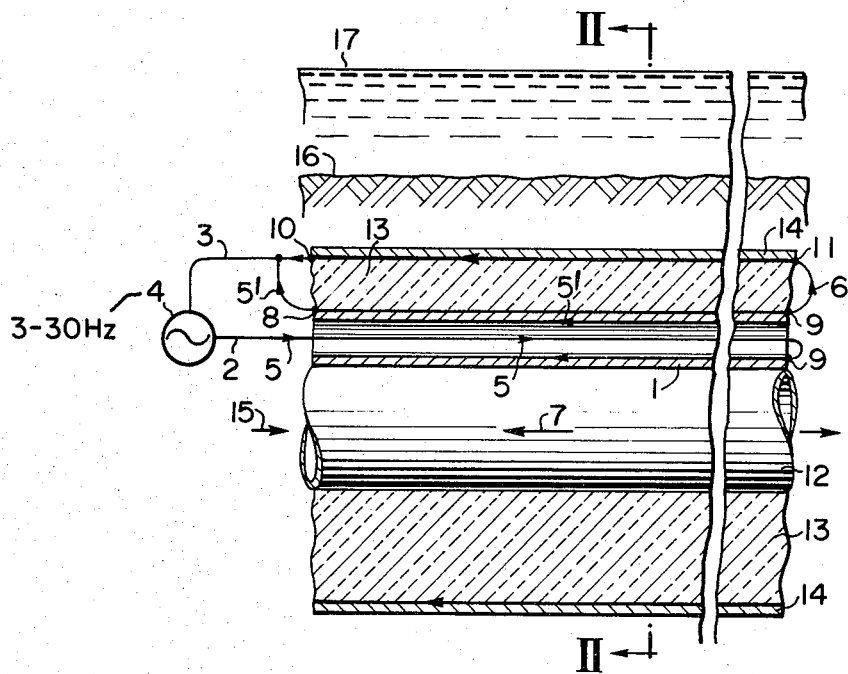
FIG. 1 shows a schematic cross-sectional view of the pipeline of the present invention in a the direction of length.
Figure 2:
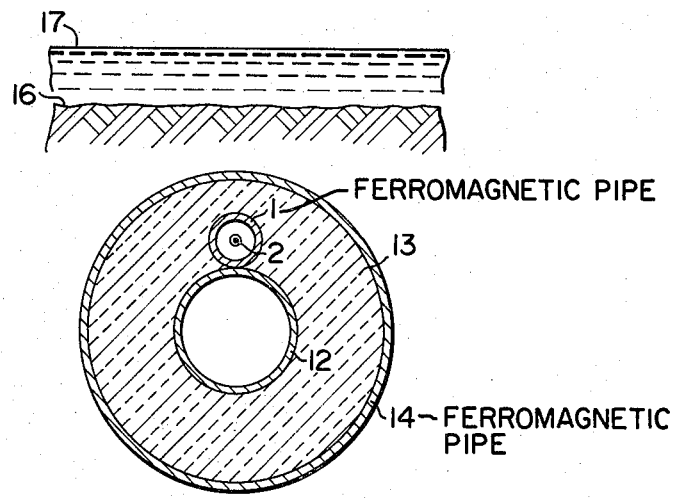
FIG. 2 shows a schematic cross-sectional view of the pipeline of FIG. 1 cut along the line II—II.

As shown in FIGS. 1 and 2, in the case of heat-insulated pipelines, an outer covering pipe 14 is usually employed for preventing a heat-insulating layer 13 from external damages and making it water-proof, and a plastic or steel pipe is usually employed as the outer covering pipe 14, but, in the present invention, it is necessary to employ a ferromagnetic pipe. Further, it is also necessary to electrically connect at least both the end portions 8 and 9 of the ferromagnetic pipe 1 as a heat-generating body, to the outer covering pipe 14. In this case, the connecting points of the outer covering pipe 14 are preferably points 10 and 11 close to the above-mentioned end portions 8 and 9, respectively. Points between the end portions 8 and 9 may be connected to those between the points 10 and 11, respectively.

Further, if the frequency is reduced from a commercial one, e.g. 60 Hz to about 15 Hz, it is seen from the equation (4) that the resistance R of the ferromagnetic pipe 1 is reduced down to $\frac{1}{2}$, while the skin depth S increases to twice in view of the equation (1). Thus, if a ferromagnetic pipe having a thickness $t_1$ same as that in the case of 60 Hz is employed as the pipe 1, the current flowing out to the outside of the ferromagnetic pipe, of course, increases in the case of 15 Hz. Namely, if the transporting pipe 12 is a metallic pipe, the current 7 flowing out to the transporting pipe 12 as well as the current 6 flowing out to the outer covering pipe 14 connected to the ferromagnetic pipe 1 will increase.

However, if the thickness $t_2$ of the outer covering pipe 14 satisfies the relationship of the equation (2) (i.e. $t > 2S$), for example, in the case of $f = 15$ Hz, as compared with the skin depth S calculated from the equation (1), then the flowing-out current 6 substantially does not flow further to the outside of the outer covering pipe 14 e.g. to the earth.

Since a considerable size is generally required for the thickness $t_2$ of the outer covering pipe 14, not only for preventing current from flowing-out, but also for preventing the pipe from incurring external damages, external pressure and corrosion, the relationship of the equation (2) comes into existence without so large an increase in the thickness even in the case of a low frequency of about 15 Hz.

Further, the current 7 flowing out to the transporting pipe 12, even when it flows out, serves the purpose of heating, as it is, whereas the current 6 flowing out to the outer covering pipe causes a heat loss. However, even on the assumption that a current i equal to 10% of the current 5 flows out to the outer covering pipe, since the inner diameter $d_2$ of the outer covering pipe 14 has the following relationship relative to the inner diameter $d_1$ of the ferromagnetic pipe 1:

$$d_2 >> d_1 \qquad (5),$$

it is seen by referring to the equation (4) that the resistance of the outer covering pipe 14 is extremely small, and hence the power loss $i^2 R$ is also far smaller than 1%.

In the structure of the present invention as mentioned above, it is very easy in the case of a pipeline having a length of 100 km and feed of electricity to both the ends thereof, to reduce its electric source voltage from usual value 25 KV down to 10 KV or lower, and yet there is almost no reduction in the heating efficiency.

It is true that not an electric source of usual frequency but a special source of low frequency is usually required. But, e.g. in the case of a heat-insulated pipeline having a length of 100 km, the heating power required therefor is usually 6-10 MVA, dependent on the diameter of the transporting pipe and the temperature at which the pipeline is maintained, and thus, even when a special generator and a special frequency-converter are provided, the cost required therefor is only a few percent or less of the total initial cost; hence such means are much economical as compared with a heat-resistant, special cable for high voltage whose cost amounts to to several times 10% of the total initial cost.

The above description refers to the case where the transporting pipe 12 is of a good conductor such as steel pipe. In such a case, it has been known as a result of practical use that, by connecting the ferromagnetic pipe 1 to the transporting pipe 12 in electrically integral manner, only a slight flowing-out current 7 occurs, but, instead the residual voltage of the outer skin of the ferromagnetic pipe 1 decreases down to nearly zero, resulting in increased safety. On the other hand, if the transporting pipe 12 is of an insulating material such as plastics, no flowingout current 7 is present and hence the residual voltage of the outer skin of the ferromagnetic pipe 1 does not decrease. However, according to the device of the present invention, the ferromagnetic outer covering pipe 14 reduces the residual voltage of the outer skin of the ferromagnetic pipe 1, and contributes to safety. This has a particularly large effectiveness for a long distance pipeline as long as 100 km as illustrated herein, since such a pipeline has a high residual voltage.

The electric source voltage to be applied in the present invention is usually preferred to be in the range of about 3 to 30 Hz.

The above description refers to a case where one ferromagnetic pipe is fixed to the ferromagnetic pipe 1, i.e. a case of a single phase circuit. However, the apparatus of the present invention can be also constructed even in the case of two-phase or three-phase circuit, which will be readily apparent to one of ordinary skill in the art.

What is claimed is:

1. In a pipeline to be heated by skin-effect current wherein a skin-effect-current heat-generating pipe as a heating source is laid along a fluid-transporting pipe of the pipeline so as to trace the same and consists of a ferromagnetic pipe and an insulated electric wire passed therethrough, and has a circuit so devised that, when a first alternating current is passed through said electric wire, a second alternating current flows through said ferromagnetic pipe in the direction opposite to that of the first alternating current in response thereto while being concentrated in the vicinity of the inner surface of said ferromagnetic pipe, the improvement comprising that said pipeline additionally includes an outer covering pipe of a ferromagnetic material provided so as to enclose the outer periphery of both said fluid-transporting pipe and said heat-generating pipe, said covering pipe being electrically connected to at least both end portions of said ferromagnetic pipe; and the thickness of said outer covering pipe being selected so that any alternating current that leaks out of said skin-effect-current pipe substantially does not appear on the outside of said outer covering pipe, but instead flows only through the inner skin portion of said outer covering pipe.

2. A pipeline according to claim 1 wherein the thickness of said outer covering pipe satisfies the following equation:

$$t > 2S$$

$$S = 5030 \sqrt{\frac{\rho}{\mu f}}$$

wherein t represents the thickness in cm of said outer covering pipe; S represents the skin depth in cm of an alternating current flowing in a concentrated manner on the portion close to the inner surface of said outer covering pipe; $\rho$ represents the specific resistivity of said outer covering pipe (unit: $\Omega$cm); $\mu$, the specific permeability of said outer covering pipe; and f, the frequency of electric source for said skin-effect-current heat-generating pipe (unit: Hz), respectively.

3. A pipeline according to claim 1 or claim 2 wherein the frequency of electric source for said skin-effect-current heat-generating pipe is less than 60 Hz.

4. A pipeline according to claim 3 wherein said frequency of electric source for said skin-effect-current heat-generating pipe is in the range of 3 to 30 Hz.

* * * * *